(12) United States Patent
Yoon et al.

(10) Patent No.: US 8,638,544 B2
(45) Date of Patent: Jan. 28, 2014

(54) REDUCTION-RESISTANT DIELECTRIC COMPOSITION AND CERAMIC ELECTRONIC COMPONENT INCLUDING THE SAME

(75) Inventors: Seok Hyun Yoon, Seoul (KR); Sung Hyung Kang, Seoul (KR); Ji Young Park, Gyunggi-do (KR); Kang Heon Hur, Gyunggi-do (KR); Sang Hoon Kwon, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 29 days.

(21) Appl. No.: 13/167,430

(22) Filed: Jun. 23, 2011

(65) Prior Publication Data

US 2012/0033343 A1 Feb. 9, 2012

(30) Foreign Application Priority Data

Aug. 6, 2010 (KR) .......................... 10-2010-0076103

(51) Int. Cl.
*H01G 4/30* (2006.01)
*H01G 4/06* (2006.01)
*C04B 35/00* (2006.01)

(52) U.S. Cl.
USPC .............. 361/321.2; 361/301.4; 501/136; 501/137; 501/138

(58) Field of Classification Search
USPC ............. 361/301.4, 321.2; 501/136, 137, 138
See application file for complete search history.

(56) References Cited

U.S. PATENT DOCUMENTS

2010/0165542 A1* 7/2010 Sohn et al. .................... 361/313

FOREIGN PATENT DOCUMENTS

| JP | 10-139539 A | 5/1998 |
| JP | 11-147716 A | 6/1999 |
| JP | 2002-037663 A | 2/2002 |
| JP | 2003-165768 A | 6/2003 |
| JP | 2007-254169 | 10/2007 |
| JP | 2008-254935 | 10/2008 |
| WO | WO-0208147 A1 | 1/2002 |
| WO | WO-2010100827 A1 | 9/2010 |

OTHER PUBLICATIONS

L.J.H. Liebrecht,"Sol-gel derived Barium Titanate Thin Films", Jan. 12, 2006, University of Twente, Master Thesis, p. 18-19.*
Japanese Office Action issued in Japanese Application No. 2011-169062, mailed on Nov. 6, 2012.

* cited by examiner

*Primary Examiner* — Eric Thomas
*Assistant Examiner* — Arun Ramaswamy
(74) *Attorney, Agent, or Firm* — McDermott Will & Emery LLP

(57) ABSTRACT

There are provided a reduction-resistant dielectric composition and a ceramic electronic component including the same. The reduction-resistant dielectric composition may include a $BaTiO_3$-based matrix powder, 0.1 to 1.0 moles of a transition metal oxide or transition metal carbonates, based on 100 moles of the matrix powder, and 0.1 to 3.0 moles of a sintering aid including silicon oxide ($SiO_2$). The ceramic electronic component including the reduction-resistant dielectric composition may have a high capacitance and superior reliability.

6 Claims, 15 Drawing Sheets

A-A`

REDUCTION-RESISTANT DIELECTRIC COMPOSITION AND CERAMIC ELECTRONIC COMPONENT INCLUDING THE SAME

CROSS-REFERENCE TO RELATED APPLICATIONS

This application claims the priority of Korean Patent Application No. 10-2010-0076103 filed on Aug. 6, 2010, in the Korean Intellectual Property Office, the disclosure of which is incorporated herein by reference.

BACKGROUND OF THE INVENTION

1. Field of the Invention

The present invention relates to a reduction-resistant dielectric composition and a ceramic electronic component including the same, and more particularly, to a reduction-resistant dielectric composition which may have a high capacitance and superior reliability, and a ceramic electronic component including the same.

2. Description of the Related Art

In general, an electronic component using a ceramic material such as a capacitor, an inductor, a piezoelectric device, a varistor, a thermistor, or the like may include ceramic body made of the ceramic material, an internal electrode formed inside the ceramic body, and an external electrode formed on an outer surface of the ceramic body and connected to the internal electrode.

Among the ceramic electronic components, a multi-layer ceramic capacitor (MLCC) may include a plurality of laminated dielectric layers, internal electrodes arranged to face each other through a single dielectric layer, and an external electrode electrically connected to the internal electrodes.

The multi-layer ceramic capacitor has been widely used as a component of mobile communications device such as a computer, a personal digital assistant (PDA), a mobile phone, and the like, due to advantages such as miniaturization, high capacitance, and the ability to be readily mounted.

The multi-layer ceramic capacitor may generally be fabricated such that a conductive paste for the internal electrode and a dielectric paste are laminated in a sheet scheme or a printing scheme, and are simultaneously subjected to firing.

However, when being subjected to firing under a reducing atmosphere, a dielectric material used for a conventional multi-layer ceramic capacitor may be reduced to be changed into a semiconductor. Because of this, as a material of the internal electrode, a precious metal may be used, such as palladium (Pd), which is not melted at a temperature at which the dielectric material is sintered, and is not oxidized, even when being subjected to the firing under a high oxygen partial pressure so that the dielectric material is not changed into a semiconductor.

However, since a precious metal such as palladium (Pd) is expensive, it may be difficult to fabricate the multi-layer ceramic capacitor with low costs. Accordingly, as the material of the internal electrode, a relatively cheap base metal, such as nickel (Ni), a nickel (Ni) alloy, or the like, has widely been used. However, in a case of using a base metal as a conductive material of an internal electrode layer, the internal electrode layer may be oxidized when being subjected to the firing in the high oxygen partial pressure atmosphere. Accordingly, the dielectric layer and the internal electrode layer may be required to be simultaneously subjected to the firing in the reducing atmosphere.

However, when being subjected to the firing in the reducing atmosphere, the dielectric layer may be reduced, causing a reduction in insulation resistance (IR). Therefore, there is a need for a dielectric material having various compositions, which may be reduction-resistant, and may maintain a high capacitance and insulation properties.

SUMMARY OF THE INVENTION

An aspect of the present invention provides a reduction-resistant dielectric composition which may have a high capacitance and superior reliability, and a ceramic electronic component including the same.

According to an aspect of the present invention, there is provided a reduction-resistant dielectric composition, including: a $BaTiO_3$-based matrix powder; 0.1 to 1.0 moles of a transition metal oxide or transition metal carbonate, based on 100 moles of the matrix powder; and 0.1 to 3.0 moles of a sintering aid including silicon oxide ($SiO_2$).

An average particle size of the matrix powder may be 0.05 to 0.5 μm.

The transition metal element may be at least one selected from a group consisting of manganese (Mn), vanadium (V), chromium (Cr), iron (Fe), nickel (Ni), cobalt (Co), copper (Cu), and zinc (Zn).

The reduction-resistant dielectric composition may further include an oxide or carbonate including at least one of barium (Ba) or titanium (Ti) element.

According to another aspect of the present invention, there is provided a ceramic electronic component, including: a ceramic body in which a plurality of dielectric layers are laminated; an internal electrode formed inside the ceramic body, and including a base metal; and an external electrode formed on an outer surface of the ceramic body, and electrically connected to the internal electrode, wherein the dielectric layer includes a $BaTiO_3$-based matrix powder, 0.1 to 1.0 moles of a transition metal oxide or transition metal carbonate based on 100 moles of the matrix powder, and 0.1 to 3.0 moles of a sintering aid including silicon oxide ($SiO_3$).

The dielectric layer may further include an oxide or carbonate including at least one of barium (Ba) or titanium (Ti) element.

A thickness of each of the plurality of dielectric layers may be 0.1 to 10.0 μm.

The internal electrode may include Nickel (Ni) or a nickel (Ni) alloy.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
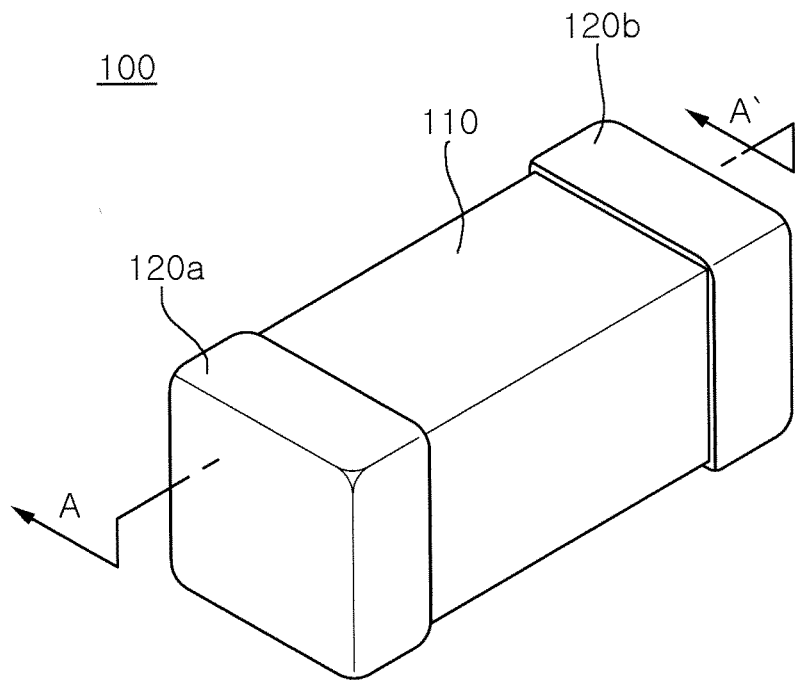
FIG. 1A is a schematic perspective view showing a multi-layer ceramic capacitor (MLCC) according to an exemplary embodiment of the present invention.

Exemplary embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, and those are to be construed as being included in the spirit of the present invention. Here, the accompanying drawings may be shown in a somewhat exaggerated manner for the description thereof, and the same or similar reference numerals will be used to designate the same components or like components having the same functions in the scope of the similar idea.

The present invention relates to a reduction-resistant dielectric composition, and as examples of a ceramic electronic component including the reduction-resistant dielectric composition according to the present invention, a capacitor, an inductor, a piezoelectric device, a varistor, a thermistor, or the like may be given. Hereinafter, as an example of the ceramic electronic component, a multi-layer ceramic capacitor (hereinafter, referred to as "MLCC") will be described in detail.

Figure 1B:
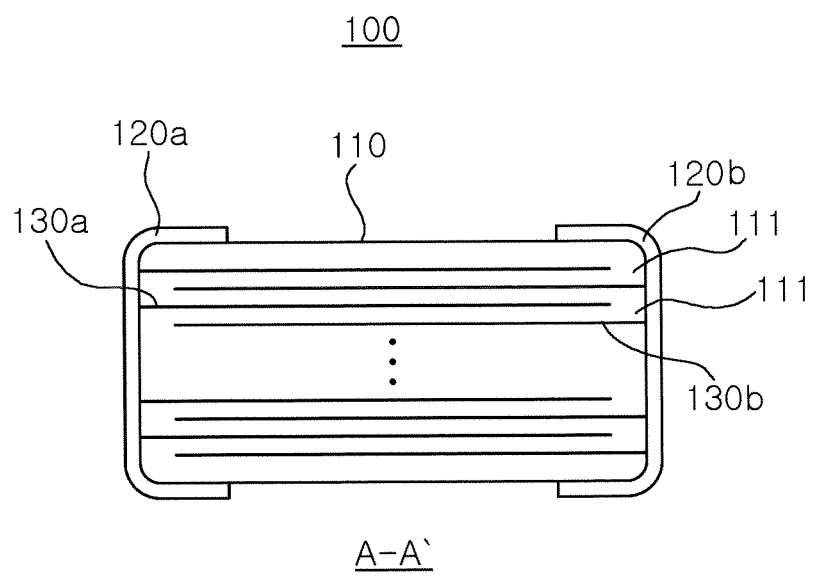
FIG. 1B is a schematic cross-sectional view showing the MLCC taken along a line A-A' of FIG. 1A.

FIG. 1A is a schematic perspective view showing an MLCC 100 according to an exemplary embodiment of the present invention, and FIG. 1B is a schematic cross-sectional view showing the MLCC 100 taken along a line A-A' of FIG. 1A.

Referring to FIGS. 1A and 1B, an MLCC 100 according to an exemplary embodiment of the present invention a dielectric layer 111 and a ceramic body 110 in which first and second internal electrodes 130a and 130b are alternatively laminated. First and second external electrodes 120a and 120b, electrically connected to the first and second internal electrodes 130a and 130b alternatively arranged inside the ceramic body 110, may be formed on both ends of the ceramic body 110.

A shape of the ceramic body 110 is not specifically limited; however, the ceramic body 110 may be generally formed to have a rectangular parallelepiped shape. Also, a dimension of the rectangular parallelepiped is not specifically limited, and thus an appropriate dimension thereof may be used according to the application thereof, for example, (0.6~5.6 mm)×(0.3~5.0 mm)×(0.3~1.9 mm).

The thickness of the dielectric layer 111 may be arbitrarily changed to meet the capacity of a MLCC design; however, in the present exemplary embodiment, the thickness of the dielectric layer 111, after being subjected to firing, may be less than or equal to 10.0 μm per layer. As for a layer of more than 10.0 μm, an abnormal grain growth may occur, and thereby it may be difficult to use the reduction-resistant dielectric composition according to the present exemplary embodiment. Also, the thickness of the dielectric layer may be less than or equal to 2.0 μm per layer to obtain desired capacitance.

When the thickness of dielectric layer is too thin so that the number of grains in a single dielectric layer is too small, the sufficient reliability might not be obtained. Thus, the thickness of the dielectric layer may be more than or equal to 0.1 μm.

The first and second internal electrodes 130a and 130b may be laminated in such a manner that respective cross-sections of the first and second internal electrodes 130a and 130b are alternatively exposed on outer surfaces of both ends of the ceramic body 110 facing each other. The first and second external electrodes 120a and 120b may be formed on both ends of the ceramic body 110, and may be electrically connected to the exposed cross-sections of the alternatively arranged first and second internal electrodes 130a and 130b, to thereby configure a capacitor circuit.

A conductive material included in the first and second internal electrodes 130a and 130b is not specifically limited; however, since component materials of the dielectric layer have a reduction-resistance property, a base metal may be used as the conductive material.

As the conductive material, a base metal such as nickel (Ni) or a nickel (Ni) alloy may be used. The nickel (Ni) alloy may be an alloy of at least one selected from manganese (Mn), chromium (Cr), cobalt (Co), and aluminum (Al) and nickel (Ni), and an amount of the nickel (Ni) may be 95 wt % or more, based on an amount of the alloy.

A thickness of each of the first and second internal electrodes 130a and 130b may be appropriately determined based on the application thereof, for example, 0.1 to 5.0 μm.

The conductive material included in the first and second external electrodes 120a and 120b is not specifically limited; however, nickel (Ni), copper (Cu), or an alloy thereof may be used. A thickness of each of the first and second external electrodes 120a and 120b may be appropriately determined based on the application thereof, for example, 10 to 50 μm.

The dielectric layer 111 constituting the ceramic body 110 may contain the reduction-resistant dielectric composition according to the present invention.

The reduction-resistant dielectric composition according to the present invention may include a $BaTiO_3$-based matrix powder, a transition metal oxide or transition metal corbonate, and a sintering aid including silicon oxide ($SiO_2$).

The reduction-resistant dielectric composition according to the present invention may have very simple composition compared with a conventional BME dielectric composition yet still ensure high permittivity and high temperature-reliability. As it can also be sintered in a low temperature-reducing atmosphere, the reduction-resistant dielectric composition according to the present invention may use an internal electrode including a base metal.

Hereinafter, respective constituents of a reduction-resistant dielectric composition according to an exemplary embodiment of the present invention will be described in detail.

a) $BaTiO_3$-Based Matrix Powder

The reduction-resistance dielectric composition according to the present invention may include a $BaTiO_3$-based powder as a base material. As a base material, a $BaTiO_3$ powders generally used for a ceramic electronic component may be used, and $(Ba_{1-x}Ca_x)TiO_3$, $Ba(Ti_{1-y}(Ba_{1-x}Ca_x)$ $(Ti_{1-y}Zr_y)O_3$, or $Ba(Ti_{1-y}Zr_y)O_3$ in which calcium (Ca), zirconium (Zr), and the like are partially employed in $BaTiO_3$, may be used as well as $BaTiO_3$.

An average particle size of the $BaTiO_3$-based powder is not specifically limited; however, may be less than or equal to a range of 0.05 μm to 0.5 b) Transition Metal Oxide or Transition Metal Carbonates

The reduction-resistant dielectric composition according to the present invention may include a transition metal oxide or transition metal carbonates as a minor constituent. The transition metal oxide or the transition metal carbonates may function to provide a reduction-resistance property and reliability of the dielectric composition, which will be described in detail later.

The amount of the transition metal oxide or the transition metal carbonates may be 0.1 to 1.0 moles based on 100 moles of the $BaTiO_3$-based powder. When the amount of the transition metal oxide or the transition metal carbonates is less than 0.1 moles, the dielectrics may be readily reduced when they are sintered in a reducing atmosphere, and resistance degradation may occur easily. Also, when the amount thereof exceeds 1.0 mole, the capacitance may decrease.

The transition metal may be selected from a group consisting of manganese (Mn), vanadium (V), chromium (Cr), iron (Fe), nickel (Ni), cobalt (Co), cooper copper (Cu), and zinc (Zn), and a type of the transition metal oxide or the transition metal carbonate is not specifically limited, and, for example, $MnO_2$, $V_2O_5$, $MnCO_3$, or the like may be used.

In order to obtain a normal capacitance and insulation properties of the MLCC, inhibition of grain growth and reduction-resistant properties are required.

It has been generally understood that the inhibition of grain growth and reduction-resistant properties can obtained by adding a fixed valence-acceptor elements such as magnesium (Mg) in the dielectric composition. However, in such case where only the fixed valence acceptor elements are doped, reliability of the dielectrics may be thereby degraded. Thus, rare earth elements are further added to improve the reliability thereof. Therefore, the co-doping of the rare earth elements and the fixed valence-acceptor elements may be the essential additives system occupying high proportion in the reduction-resistant conventional dielectric composition.

In this manner, the co-doping of the fixed valence-acceptor elements and the rare earth elements may form a core-shell structure of a grain to thereby implement stable temperature characteristic of capacitance of the MLCC.

The specific reason why the reliability of dielectrics of conventional BME MLCC composition system is improved by the addition of rare earth elements is not still clear. However, it is supposed that the rare earth element incorporated into a Ba-site act as a donor, and thus, charge compensation occurs for the ionized acceptors resulting in a decrease in the oxygen vacancy concentration and thereby improved reliability.

Until now, however, there was no document showing direct correlation between the concentration of oxygen vacancies and the reliability of a dielectric composition; however, the inventor of the present invention has experimentally verified the that the concentration of oxygen vacancies may be very systemically increased with the increase of fixed valence-acceptor, magnesium (Mg) concentration resulting in a faster resistance degradation in magnesium (Mg)-doped $BaTiO_3$ ceramic.

The inventor of the present invention also discovered that under the conventional sintering condition of BME MLCC including a re-oxidation process, a critical acceptor concentration capable of implementing the reduction-resistance properties of $BaTiO_3$ is significantly low, such as about 0.1 mol. Therefore, in order to increase the reliability of a dielectric composition, a concentration of the acceptor may be preferably minimized close to the critical concentration. However, when the concentration of the fixed valence-acceptor elements is significantly low, abnormal grain growth may easily occur in a bulk sample. Thus, a relatively high concentration of fixed valence-acceptor elements of about 1.0 mol % may be added in the dielectric composition. In order to compensate for the fast resistance degradation and inferior reliability of a dielectric composition due to the fixed valence-acceptors, the rare earth elements may be added together with the fixed valence atom in a similar amount thereto.

it has been also understood that a variable valence-acceptor elements such as manganese (Mn), vanadium (V), and chromium (Cr) may implement the reduction-resistance properties, similar to the fixed valence-acceptor elements; however, when the concentration of the variable valence-acceptor elements is too high, permittivity may be rapidly lowered, and thus, relatively small amount of variable valence acceptor elements may be doped in the dielectric composition of the BME MLCC compared with the concentration of the rare-earth elements and the fixed valence-acceptor elements.

The difference in the resistance degradation behavior between fixed valence-acceptor, Mg- and variable valence-acceptor, Mn-doped $BaTiO_3$ can be analyzed and explained as follows.

FIGS. 2A to 2D are graphs showing Electrical resistivities under voltage steps at 2000 versus time for (A) Mg and (B) Mn-doped $BaTiO_3$ specimens, respectively, that were sintered at 1360° C. in a $pO_2$ of $\sim 10^{-6.8}$ atm ($H_2/N_2/H_2O$ atmosphere, 0.1% $H_2$/99.9% $N_3$) followed by a re-oxidation anneal at 1000° C. for 5 h in air ($PO_3=\sim 0.2$ atm), and for (C) Mg and (D) Mn-doped $BaTiO_3$ specimens, respectively, that were sintered under the same condition followed by a re-oxidation anneal at 1000° C. for 5 h in $N_2$ atmosphere ($PO_2=\sim 10^{-6}$ atm). These were measured by applying a voltage step of do 120V/mm up to 1200V/mm, with the time period for each step being 1 hour.

Figure 2A:
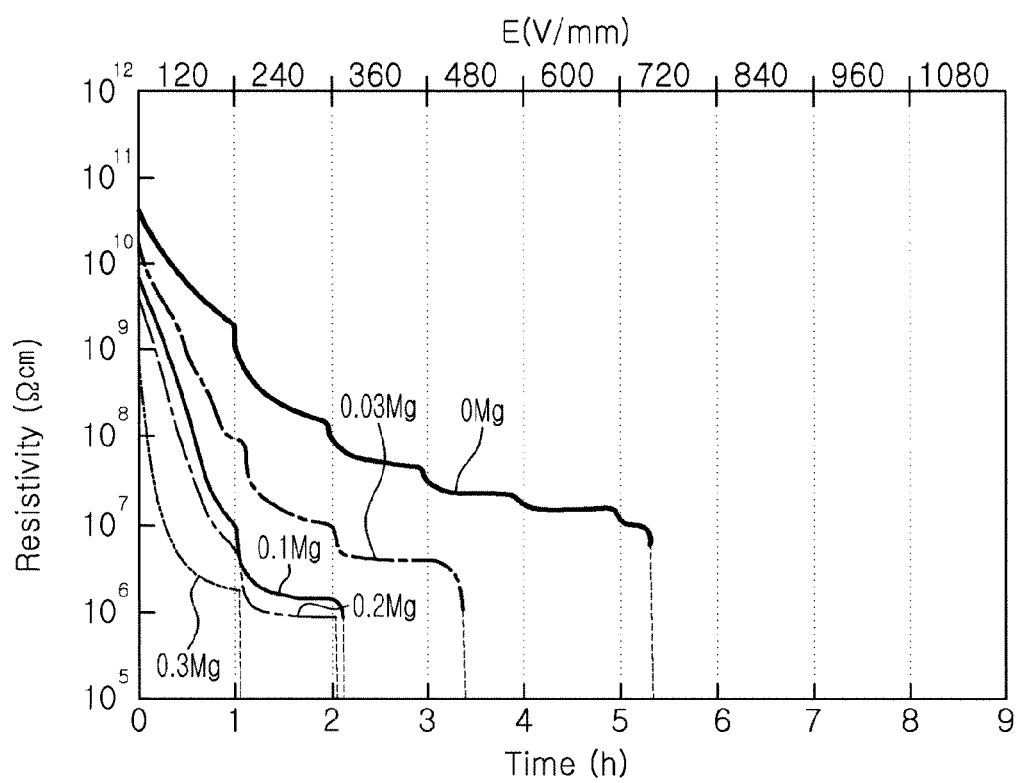
FIGS. 2A to 2D are graphs showing Electrical resistivities under voltage steps at 200° C. versus time for (A) Mg and (B) Mn-doped $BaTiO_3$ specimens, respectively, that were sintered at 1360° C. in a $pO_2$ of $\sim 10^{-6.8}$ atm ($H_2/N_2/H_2O$ atmosphere, 0.1% $H_2$/99.9% $N_2$) followed by a re-oxidation anneal at 1000° C. for 5 h in air ($pO_2 = \sim 0.2$ atm), and for (C) Mg and (D) Mn-doped $BaTiO_3$ specimens, respectively, that were sintered under the same condition followed by a re-oxidation anneal at 1000° C. for 5 h in $N_2$ atmosphere ($pO_2$=~$10^{-6}$ atm). These were measured by applying a voltage step of dc 120V/mm up to 1200V/mm, with the time period for each step being 1 hour.

Referring to FIG. 2A, it may be seen that, a systematic variation of the degradation behavior for different Mg concentrations, and significant resistance degradation is observed with the higher acceptor concentrations, that is, with time the loss of resistance becomes shorter. The inventor of this invention discovered that the increase of acceptor Mg concentration caused an increase in the bulk grain conductivity and also the portion of ionic conduction contribution, which means an increase in the oxygen vacancy concentration, and it may be a direct cause for the rapid resistance degradation.

Figure 2B:
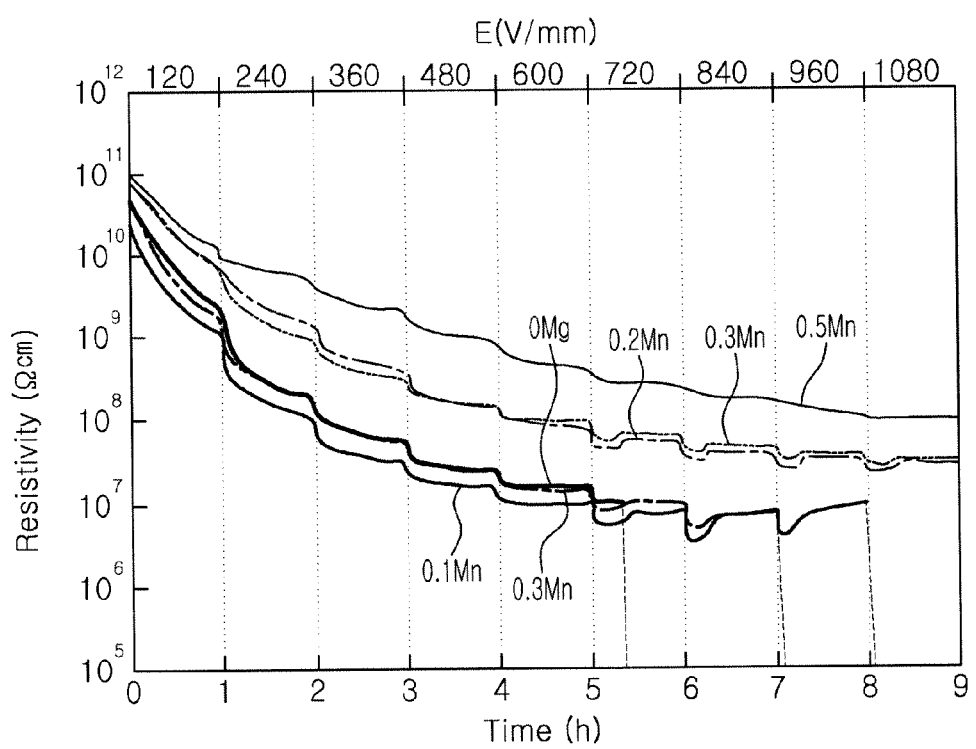

On the other hand, referring to FIG. 2B, it may be seen that, the behavior of resistance degradation is more and more improved with the increase of Mn concentration, that is, the resistance value becomes more stable and the time of the loss of resistance becomes longer.

Figure 2C:
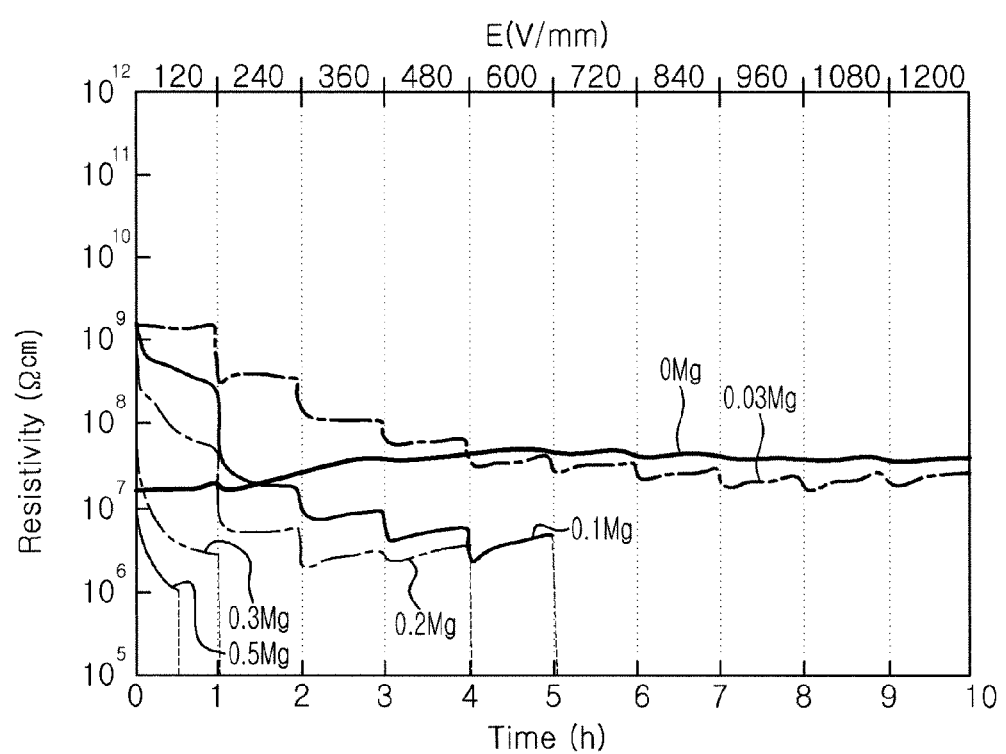
Figure 2D:
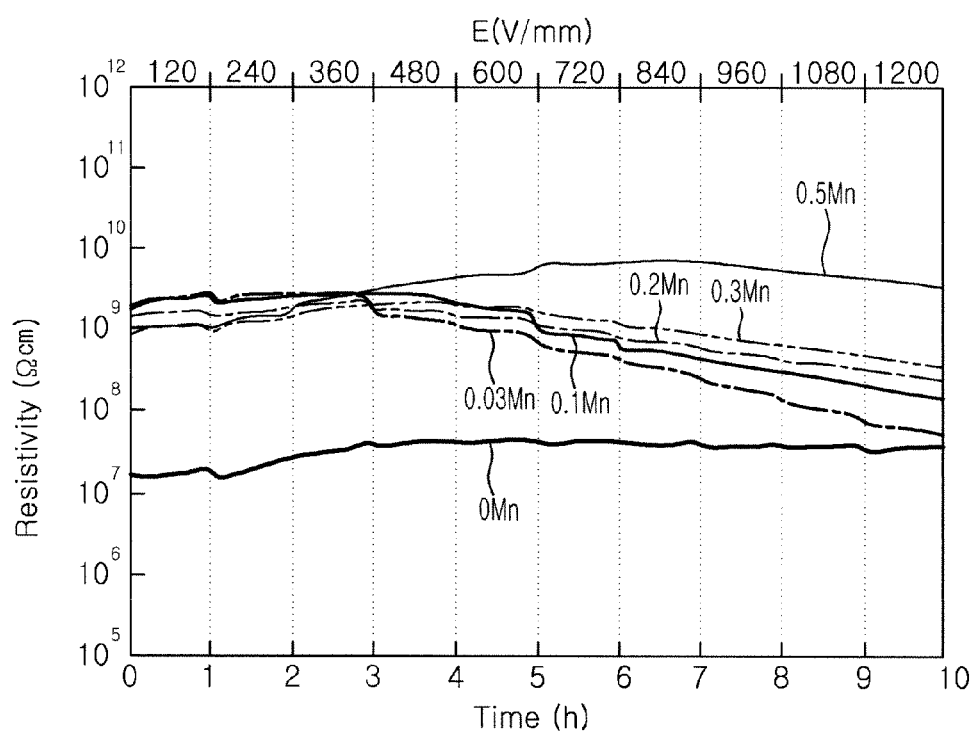

FIGS. 2C and 2D are graphs showing the electrical resistivities under voltage steps at 200° C. versus time for Mg and Mn-doped $BaTiO_3$ specimens, respectively, that were sintered under the same condition as performed in FIGS. 2A and 2B, followed by a re-oxidation anneal at 1000° C. for 5 h in $N_2$ atmosphere ($pO_2=\sim 10^{-6}$ atm). The measurement condition is the same as that of FIGS. 2A and 2B.

Referring to FIG. 2C, Mg-doped $BaTiO_3$ annealed in $N_2$ atmosphere shows similar Mg concentration effect on the degradation behavior as that of Mg-doped $BaTiO_3$ annealed in air atmosphere of FIG. 2A. However, it is observed that the degradation behavior is significantly improved in the low acceptor concentration range below 0.2 mol % Mg.

Referring to FIG. 2D, Mn-doped $BaTiO_3$ annealed in $N_2$ atmosphere also shows a similar Mn concentration effect on the resistance behavior as that of Mn-doped $BaTiO_3$ annealed in air atmosphere of FIG. 2B; however, all Mn concentration specimens also show more stable and improved resistance values compared with that of Mn-doped $BaTiO_3$ annealed in air atmosphere of FIG. 2B, and the degradation of resistance could not be observed under the test conditions of this study.

As described above, the effect of the annealing atmosphere on the resistance degradation observed in FIGS. 2A-2D seem to be a somewhat unexpected behavior, as it is conventionally believed that a more oxidizing atmosphere would decrease the oxygen vacancy ($V_O^{\cdot\cdot}$) concentration more effectively and, thereby, would be beneficial for degradation behavior.

When the transition metal element, for example Mn, is incorporated, both valence states of $Mn^{3+}$ and $Mn^{4+}$ are supposed to distribute uniformly across the specimen. In such case, hole generation in the anodic region by the depletion of $V_O^{\cdot\cdot}$, and electron generation in the cathodic region by the accumulation of $V_O^{\cdot\cdot}$ after electromigration of $V_O^{\cdot\cdot}$ under dc field, can be suppressed by the valence change $Mn^{3+} \rightarrow Mn^{4+}$ in the anodic region and $Mn^{4+} \rightarrow Mn^{3+}$ in the cathodic region, respectively, which is the known mechanism for the improved resistance degradation behavior of transition metal-doped $BaTiO_3$ system.

However, when the concentration of variable-valence acceptor increases, the increase of electron/hole trapping and $V_O^{\cdot\cdot}$ concentration would have contrary effect on the degradation behavior. There are ambiguities whether the increasing effect of electron/hole trapping can completely nullify the increasing effect of $V_O^{\cdot\cdot}$ resulting in the improved resistance degradation behavior. To verify this, the behavior of an ionic transference number may be observed by measuring Warburg impedance.

Figure 3A:
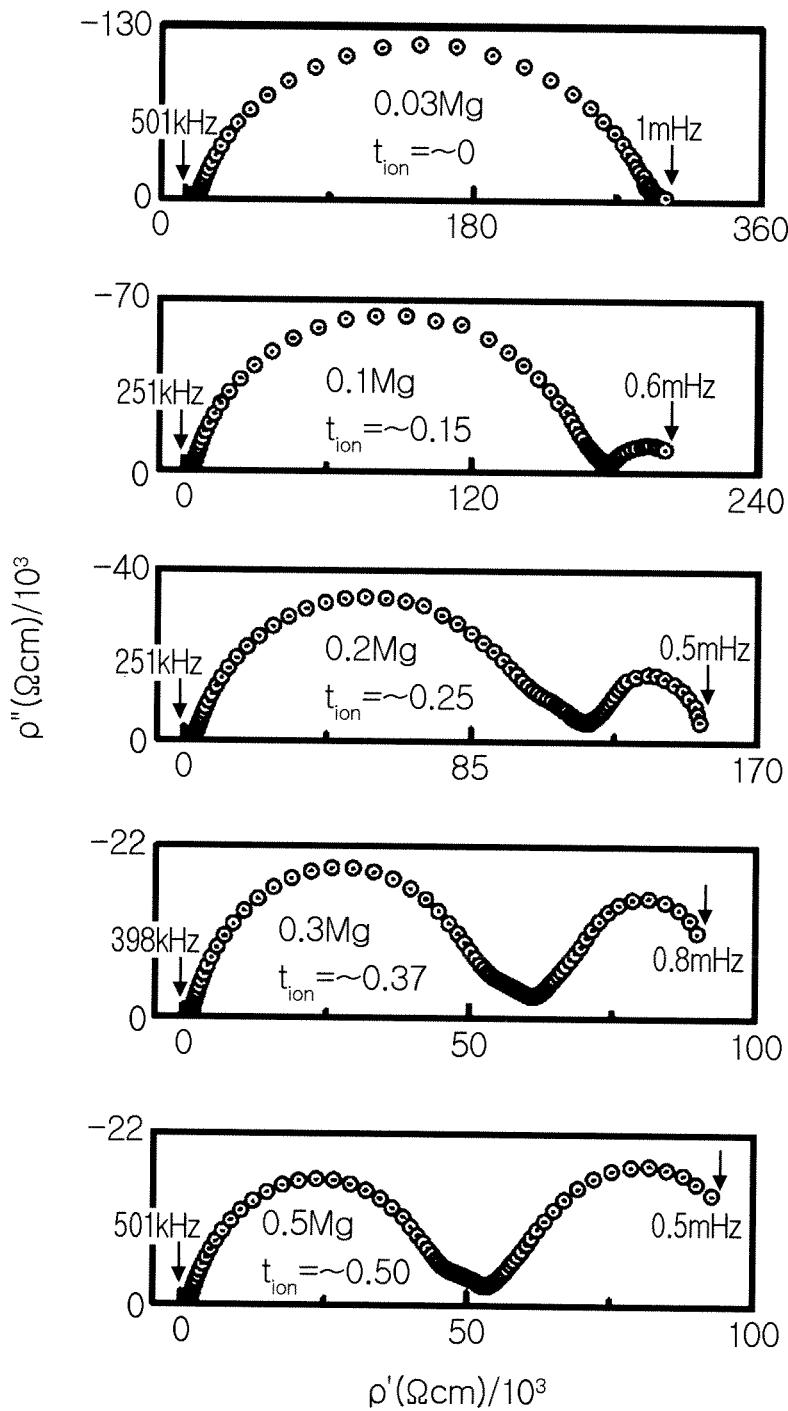
FIGS. 3A and 3B are graphs showing series of complex impedance plane plots, including a low frequency Warburg impedance that were measured at 480° C. for (A) the 0.03, 0.1, 0.2, 0.3 and 0.5 mol % Mg-doped $BaTiO_3$ and for (B) the 0.03, 0.1, 0.2, 0.3 and 0.5 mol % Mn-doped $BaTiO_3$, respectively, that were sintered at 1360° C. in a $pO_2$ of ~$10^{-6.8}$ atm ($H_2/N_2/H_2O$ atmosphere, 0.1% $H_2$/99.9% $N_2$) followed by a re-oxidation anneal at 1000° C. for 5 h in air ($pO_2$=~0.2 atm)
Figure 3B:
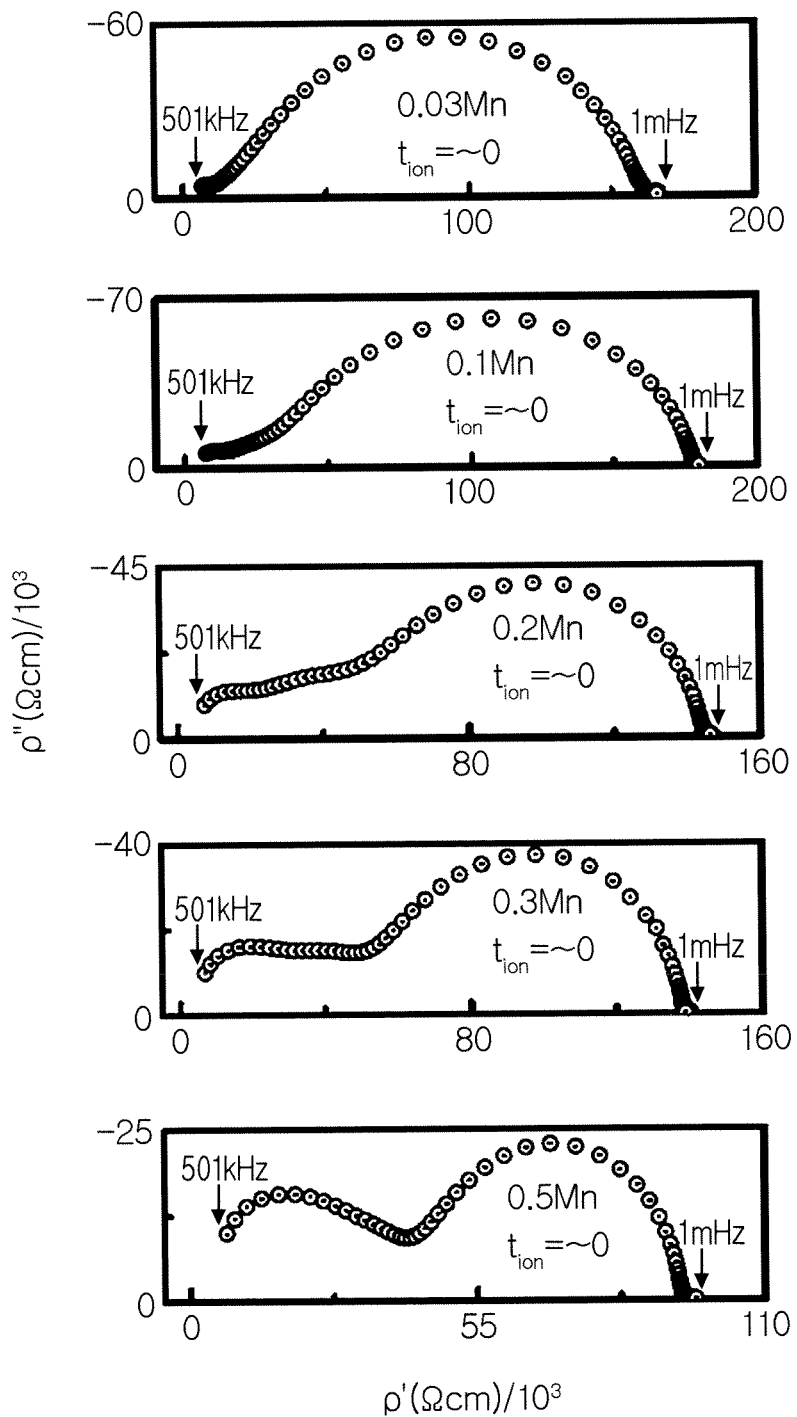

FIGS. 3A and 3B show a series of complex impedance plane plots, including a low frequency Warburg impedance, that were measured at 480° C. for the 0.03, 0.1, 0.2, 0.3, and 0.5 mol % Mg-doped $BaTiO_3$ and for the 0.03, 0.1, 0.2, 0.3, and 0.5 mol % Mn-doped $BaTiO_3$, respectively, that were sintered at 1360° C. in a $PO_2$ of $\sim 10^{-6.8}$ atm ($H_2/N_2/H_2O$ atmosphere, 0.1% $H_2$/99.9% $N_2$), followed by a re-oxidation anneal at 1000° C. for 5 h in air ($pO_2=\sim 0.2$ atm). The grain impedances of Mg-doped $BaTiO_3$ specimens were too small and, thus, completely cut-off beyond the measurement range of the high frequency limit, and grain boundary impedances and finite Warburg impedances are observed in FIG. 3A. The ionic transference number ($t_{ion}$) can be evaluated from these Warburg impedances in the case of ion blocking electrode condition. The low acceptor concentration of 0.03 mol % Mg-doped specimen does not show distinct Warburg impedance; however, the portion of Warburg impedance and ionic transference number ($t_{ion}$) systematically increases from $-0.15$ to $\sim 0.5$ with the increase of Mg concentration from 0.1 to 0.5 mol %.

On the other hand, there is no distinct increase of the Warburg impedance or the ionic transference number with the increase of the variable-valence acceptor Mn concentration in $BaTiO_3$, as shown in FIG. 3B. All Mn concentration samples show a negligible ionic transference number at 480° C. This result demonstrates that the ionic conductivity due to $V_O^{\cdot\cdot}$ is significantly lower in Mn-doped $BaTiO_3$ than in Mg-doped $BaTiO_3$, despite having the same nominal acceptor concentration.

FIGS. 4A to 4D are graphs showing the calculated oxygen vacancy concentration $C(V_O^{\cdot\cdot})$ in the unit of mole fraction versus acceptor concentration $C(A_{TOT})$ of fixed-valence acceptor Mg (solid line) and variable-valence acceptor Mn-doped $BaTiO_3$ (dotted line) in air atmosphere ($pO_2=0.2$ atm) at the temperature of 1300, 1000, 800, and 600° C., respectively.

Figure 4A:
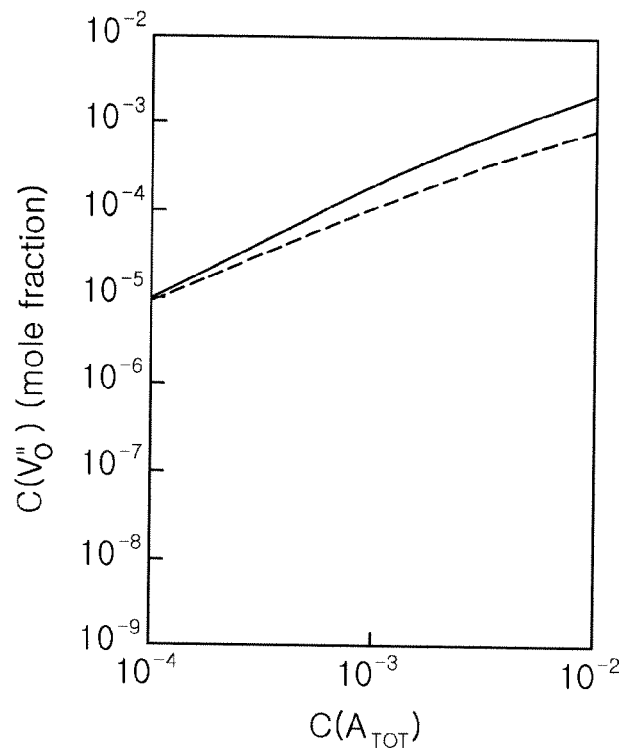
FIGS. 4A to 4D are graphs showing a calculated oxygen vacancy concentration $C(V_O^{\cdot\cdot})$ in the unit of mole fraction versus acceptor concentration $C(A_{TOT})$ of fixed-valence acceptor Mg and variable-valence acceptor Mn-doped $BaTiO_3$ in air atmosphere ($pO_2$=0.2 atm) at the temperature of (A) 1300, (B) 1000, (C) 800, and (D) 600° C., respectively.
Figure 4B:
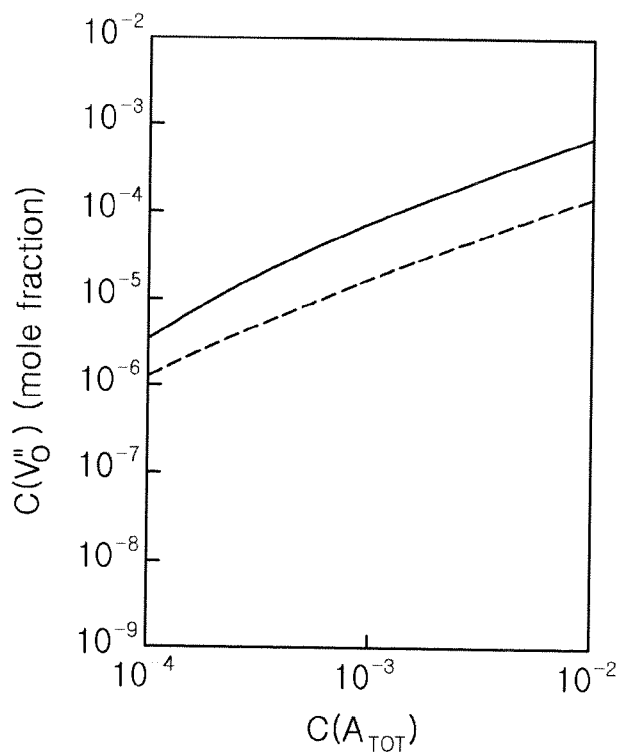
Figure 4C:
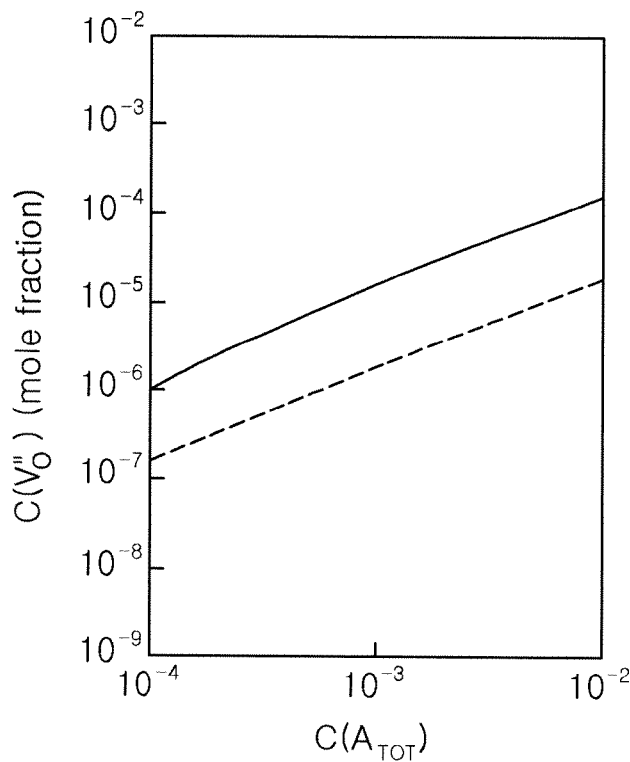

Referring to FIG. 4A, the difference of $C(V_O^{\cdot\cdot})$ between Mg and Mn-doped $BaTiO_3$ is not significant in the entire range of $C(A_{TOT})$ at the high temperature of 1300° C. However, the $C(V_O^{\cdot\cdot})$ of Mn-doped $BaTiO_3$ becomes increasingly lower compared with that of Mg-doped $BaTiO_3$ with the decrease in temperature. It demonstrates that the $V_O^{\cdot\cdot}$ concentration can be much more effectively decreased during a cooling process in the Mn-doped $BaTiO_3$ than in the Mg-doped $BaTiO_3$.

Figure 4D:
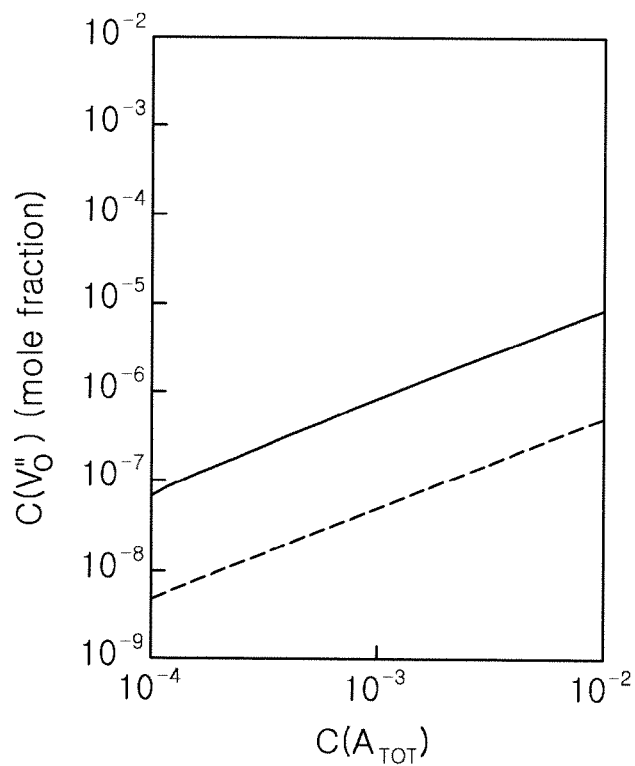

As for the concentration $C(V_O^{\cdot\cdot})$ at 600 shown in FIG. 4D, $C(V_O^{\cdot\cdot})$ at $C(A_{TOT})$ of 0.005 (0.5 mol %) of the variable-valence acceptor Mn-doped $BaTiO_3$ is lower than that of 0.0003 (0.03 mol %) of the fixed-valence acceptor Mg-doped $BaTiO_3$, which could explain why there is no distinct increase of Warburg impedance and ionic conduction for samples with Mn concentration up to 0.5 mol %, as was observed in FIG. 3B.

Figure 5A:
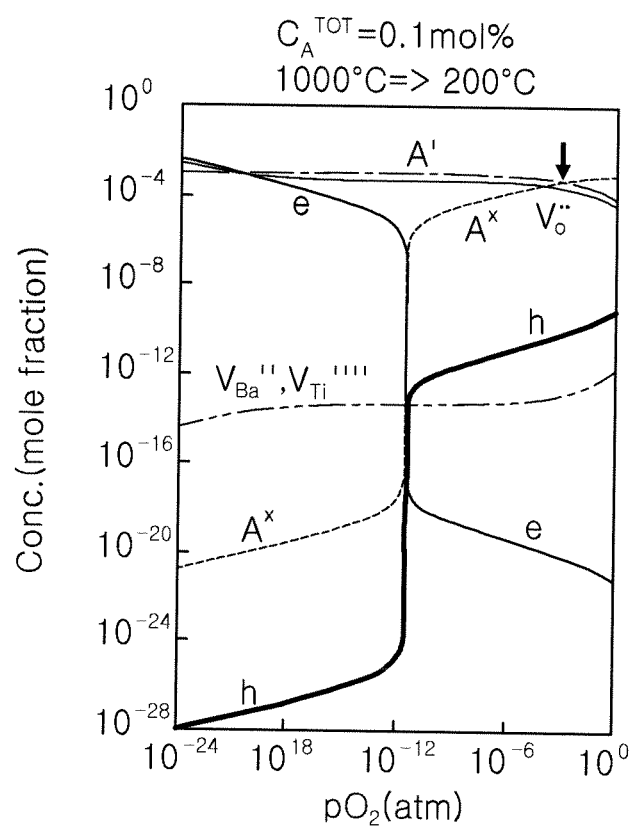
FIGS. 5A to 5D are graphs showing a calculated each defect concentration in the unit of mole fraction versus $pO_2$ of (A) fixed-valence acceptor Mg and (B) variable-valence acceptor Mn-doped $BaTiO_3$, respectively, for the total acceptor concentration $C_A^{(TOT)}$ of $10^{-3}$ (0.1 mol %), and fixed-valence acceptor (C) Mg and (D) variable-valence acceptor Mn-doped $BaTiO_3$, respectively, for the total acceptor concentration $C_A^{(TOT)}$ of $10^{-2}$ (1.0 mol %), when the ionic defect structures at high temperature of 1000° C. are frozen-in to 200° C. where resistance degradation behaviors were measured.
Figure 5B:
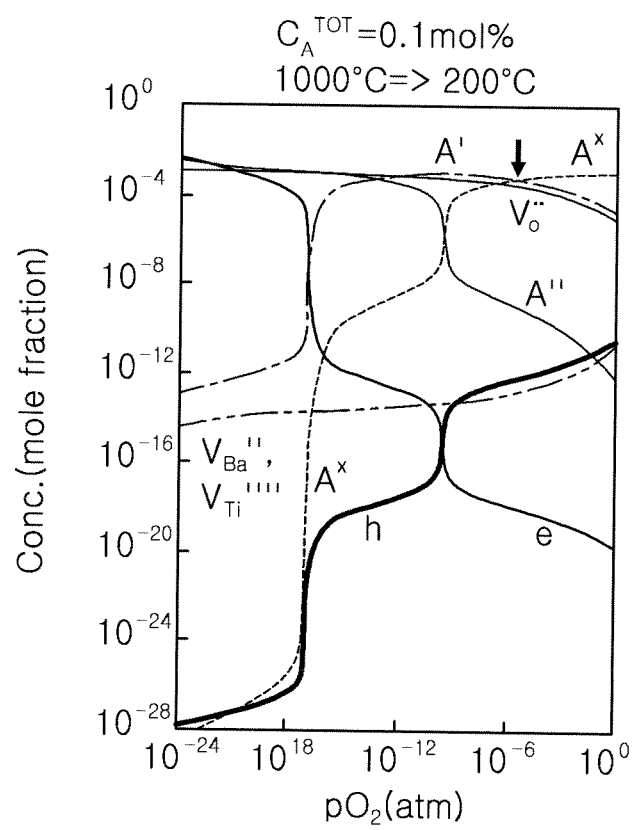
Figure 5C:
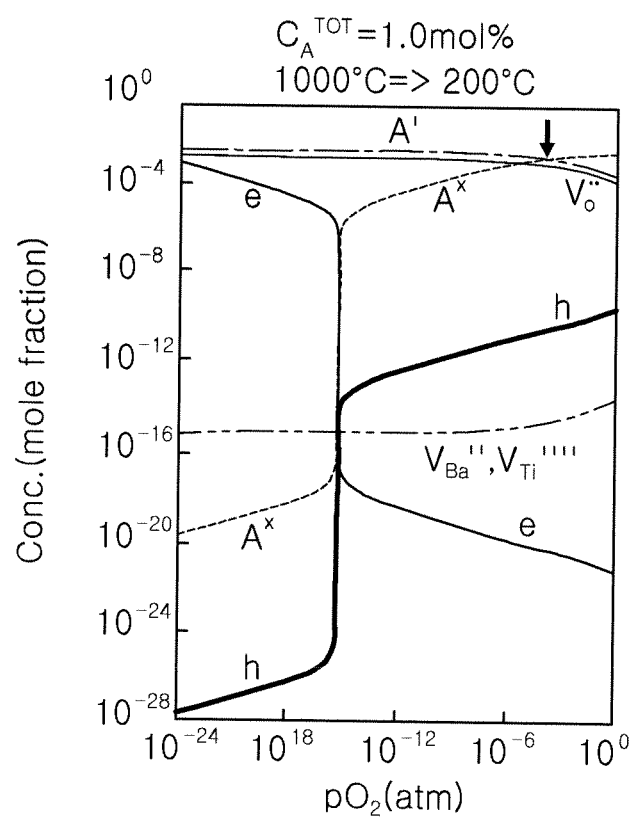
Figure 5D:
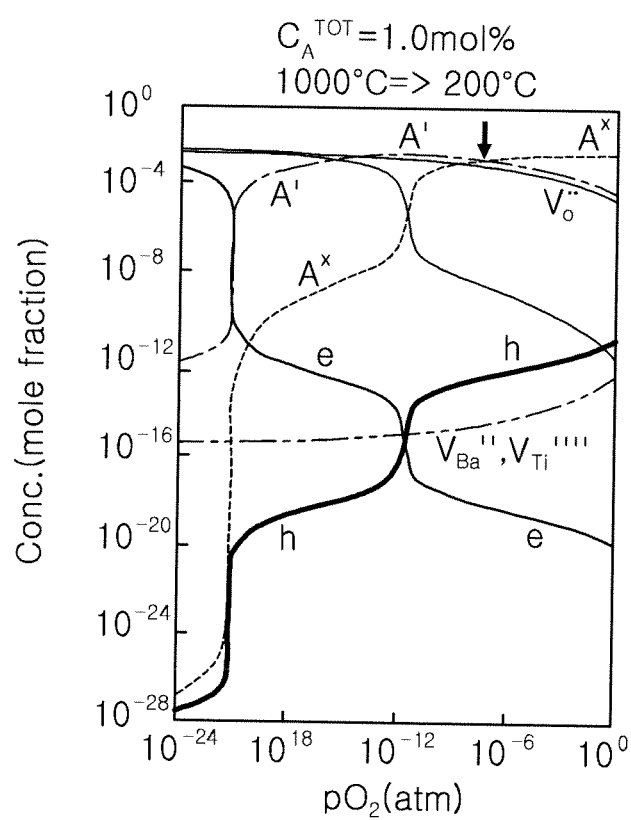

FIGS. 5A and 5B show calculated defect concentrations for each species in mole fraction versus $pO_2$ of the fixed-valence acceptor Mg and variable-valence Mn-doped $BaTiO_3$, respectively, for the total acceptor concentration $C_A^{(TOT)}$ of $10^{-3}$ (0.1 mol %); note that the ionic defect structures at high temperature, for example, 1000° C. are frozen-in to 200° C., which is the conditions for the resistance degradation study, whereas FIGS. 5C and 5D show the calculated defect concentrations for a total acceptor concentration $C_A^{(TOT)}$ of $10^{-2}$ (1.0 mol %).

Considering the mechanism for the resistance degradation with a variable-valence acceptor-doped $BaTiO_3$ system, it is supposed that there is hole generation in the anodic region by the depletion of $V_O^{\cdot\cdot}$, and, likewise, electron generation in the cathodic region, as created by the accumulation of $V_O^{\cdot\cdot}$ after electromigration of $V_O^{\cdot\cdot}$ under dc field. This would be most effectively suppressed when $A^x$ ($Mn^{4+}$) and A' ($Mn^{3+}$) exist in the same ratio. If there is only $A^x$ ($Mn^{4+}$) or A' ($Mn^{3+}$), trapping of holes or electrons is not equally controlled.

Thus it should be noted in FIGS. 5A-5D that the concentration of $A^x$ and A' becomes the same at the $pO_2$ of $10^{3}$~$10^{-4}$ atm for the fixed-valence acceptor Mg-doped $BaTiO_3$, and at the $pO_2$ of $10^{-5}$~$10^{-7}$ atm for the variable-valence acceptor Mn-doped $BaTiO_3$, respectively, which are indicated by the arrows in each figure. It is also observed that most acceptors exist as $A^x$, and the portion A' is much smaller in air atmosphere (pO$_2$=0.2 atm) for both fixed-valence (Mg) and variable-valence (Mn)-doped BaTiO$_3$. Therefore, ideally, improved resistance to degradation should be when the dielectric is in a slightly reducing atmosphere (N$_2$). It also seems that the electron/hole trapping effect contributes to improvement of degradation behavior, not only in the variable-valence acceptor (Mn)-doped BaTiO$_3$, but also in the fixed-valence acceptor (Mg)-doped BaTiO$_3$.

These results infer that the electron/hole trapping, as well as V$_O^{\cdot\cdot}$ concentration, is a very important factor governing the resistance degradation behavior. However, when the V$_O^{\cdot\cdot}$ concentration is too high, such as the case of 0.3 and 0.5 mol % Mg-doped BaTiO$_3$, the effect of V$_O^{\cdot\cdot}$ concentration is supposed to outweigh electron/hole trapping effect, resulting in no difference in the resistance degradation behavior between N$_2$ and air atmosphere annealing, as is indicated in FIGS. 2A and 2C Accordingly, since the fixed valence acceptor element such as magnesium (Mg) may be an element by which resistance degradation occurs easily, the reduction-resistant dielectric composition according to an exemplary embodiment of the present invention may not include the fixed valence-acceptor elements.

The variable valence-acceptor element such as manganese (Mn) may implement a reduction-resistance property while rarely generating the oxygen vacancies, and have an effect suppressing resistance degradation due to the electron/hole trapping effect, in comparison with the fixed valence-acceptor elements. Therefore, according to an exemplary embodiment, the reduction-resistant property and reliability of a dielectric composition may be simultaneously implemented by the variable valence-acceptor elements.

Also, since the concentration of oxygen vacancies may be significantly low when only including the variable valence-acceptors without including the fixed valence-acceptors such as magnesium (Mg), there is no need to include rare earth elements acting as donors and performing charge compensation for the ionized fixed valence-acceptors.

A dielectric of a conventional high capacitance-MLCC may include the fixed valence-acceptor elements such as such as magnesium (Mg) with a significant amount of about 1 mol %. This is because the rare earth atom is doped together for the purpose of suppressing abnormal grain growth of a BaTiO$_3$ dielectric and of the formation of core-shell structure.

However, the present inventor has discovered a new phenomenon in which abnormal grain growth may occur in a bulk sample in the case of a BaTiO$_3$ material in which only a small amount of the variable valence-acceptor elements are doped without including a fixed valence-acceptor elements or in the case of a pure BaTiO$_3$ material, however, the abnormal grain growth may not occur in a case, where the thickness of a dielectric such as a MLCC is significantly small.

Figure 6A:
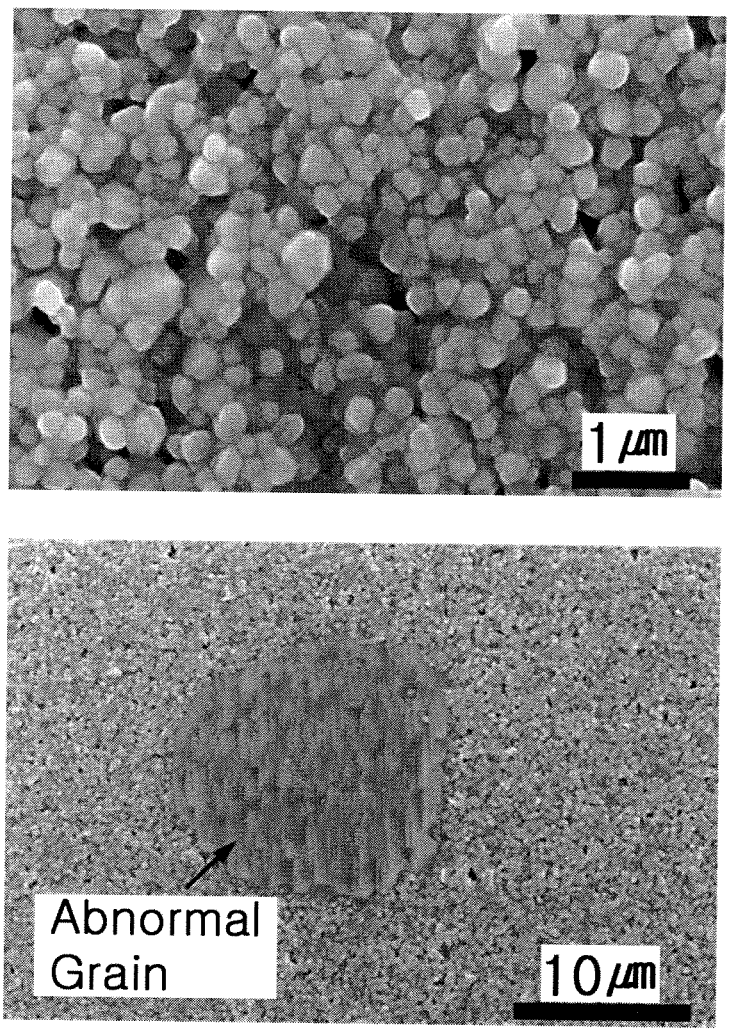
FIGS. 6A and 6B are microstructures of (A) a bulk ceramic sample of variable valence acceptor-doped $BaTiO_3$ and (B) a MLCC sample, respectively.
Figure 6B:
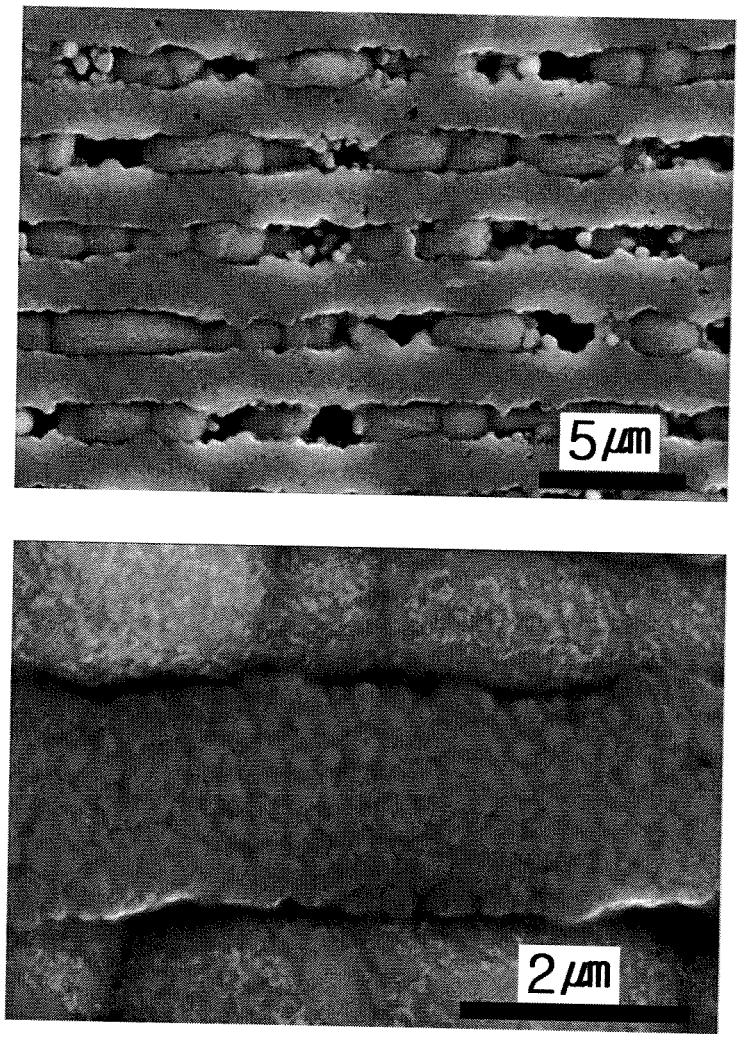

FIGS. 6A and 6B shows a microstructure of a bulk ceramic and MLCC specimen, respectively, for the 0.2 mol manganese (Mn)- and 0.1 mol % Vanadium (V)-doped BaTiO$_3$ material, that is, a only small amount of the variable valence acceptor-elements are doped with no addition of the rare earth-elements and the fixed valence-acceptor elements.

The bulk sample of FIG. 6A was fired at 1190 in a reducing atmosphere (H$_2$/N$_2$/H$_2$O atmosphere, 0.1% H$_2$/99.9% N$_2$), and the MLCC sample of FIG. 65 was fired at 1205 in the same atmosphere. It may be verified that the bulk sample has a duplex structure, where abnormal grains with sizes of 10 μm or more co-exist with fine matrix grains with a size of about 0.2 μm. Contrary, in the MLCC sample, it may be verified that the abnormal grain is not generated in spite of a higher sintering temperature.

Accordingly, in the high capacitance-MLCC using the dielectric layer with a significantly thin thickness, desired characteristics may be obtained even without including the fixed valence-acceptor elements such as magnesium (Mg) and the rare earth elements in order to suppress the abnormal grain growth.

According to an exemplary embodiment, the fixed valence-acceptor elements and the rare earth-elements that occupied a high proportion in the conventional art are not included. In addition, as the thickness of the dielectric layer of an ultra-high capacitance MLCC may gradually become thinner, and the size of the matrix powder may gradually become smaller in the future, it may be difficult to mix uniformly the matrix powder and other additives; however, according to the present invention, the type and the amount of the additives may be significantly reduced in comparison with the conventional dielectric formulation materials to thereby overcome a problem in the uniform dispersion of additives, and thereby an MLCC having a more improved performance may be manufactured. Also, since the rare earth-elements that is seriously difficult to be supplied is not used, the manufacturing costs of the MLCC are thereby reduced.

c) Sintering Aid Including Silicon Oxide (SiO$_2$)

The reduction-resistant dielectric composition according to an exemplary embodiment of the present invention may include a sintering aid including silicon oxide (SiO$_2$) in order to reduce a firing temperature and promote sintering. The sintering aid including silicon oxide (SiO$_2$) may include 0.1 to 3.0 moles based on 100 moles of the matrix powder.

When an amount of the sintering aid is less than 0.1 moles, or exceeds 3.0 moles, sintering properties may be deteriorated.

The sintering aid including silicon oxide (SiO$_2$) is not specifically limited, and a sintering aid typically used in the related art may be used. That is, the sintering aid may include such elements as barium (Ba), calcium (Ca), aluminum (Al) or lithium (Li) in order to enhance the sintering by forming liquid phase during sintering.

d) Oxide or Carbonate Including at Least One of Ba and Ti

Also, the reduction-resistant dielectric composition according to an exemplary embodiment of the present invention may include an oxide or carbonate including at least one of Ba and Ti in order to approximately adjust grain size. The oxide and carbonate are not limited thereto; however, BaCO$_3$ or TiO$_2$ may be used.

When a Ti element is added to a B-site of the matrix powder having a perovskite structure of ABO$_3$, grain size of the MLCC dielectrics may be reduced, and when a Ba element is added to an A-site thereof, the grain size thereof may be increased.

Accordingly, based on a the case that a variable valence-acceptor is employed in the matrix powder with an ABO$_3$ structure, a ratio of A and B may be adjusted in a range of 0.98<A/B<1.02 by adding Ba or Ti elements, thereby a desired grain size may be obtained.

When the ratio of A and B is out of the range, there may be problems such as deterioration of sintering property and the formation of secondary phase.

Hereinafter, the present invention will be described in detail by examples and comparative examples. It is to be understood, however, that these examples are for illustrative purpose only, and should not be construed as limiting the scope of the present invention.

With respect to a dielectric composition shown in Table 1 below, the powders were ball-milled using zirconia ball media in an ethanol/toluene (50/50) solution with a dispersant (BYK-103, BYK Chemie, GmbH, Wesel, Germany) for 12 hours. After this, an organic binder solution (Polyvinyl Acetal Resin) was added and ball-milled again for 15 hours. These slurries were separated from the zirconia media and tape-cast into green sheets for active layer and cover layer using a doctor blade coater.

Based on the fact that a variable valence acceptor element is employed in a B-site of a perovskite structure of $ABO_3$, $TiO_2$ was adjusted to be added so that a ratio of A and B is 1:1.005. $SiO_2$, that is, the sintering aid was fixed as 0.4 mol %, so that the behavior of electrical properties with the variation in the type and the amount of manganese (Mn) and vanadium (V), that is, the variable valence-acceptor elements was observed.

Prototype $Ni/BaTiO_3$ BME MLCCs with 3216 size were produced by applying standard multi-layer process of screen-printing of Ni-electrode on the green sheets, stacking, pressing, and cutting. The MLCC chips were binder-burn out, sintered at 1100 to 1250° C. in 0.1% H2/99.9% N2 ($H_2O/H_2/N_2$ atmosphere), followed by a re-oxidation anneal at 1000° C. for 3 h in $N_2$ atmosphere ($pO_2 = \sim 10^6$ atm). The sintered chips were subjected to a termination process using a copper (Cu) paste, and subjected to electrode-firing, thereby obtained an external electrode. Accordingly, after the firing, an MLCC chip with a size of 3.2 mm×1.6 mm in which a thickness of the dielectric is less than or equal to 2.0 µm, and the number of layers of the dielectric is 20 was manufactured.

In a comparative reference example, an MLCC chip was manufactured in the same way as described above using a dielectric composition including 100 moles of $BaTiO_3$, 0.4 moles of $Y_2O_3$, 1.0 mole of $MgCO_3$, 0.4 moles of $BaCO_3$, 0.1 moles of $MnO_2$, 0.05 moles of $V_2O_b$, 1.35 moles of $SiO_2$, and 0.0625 moles of $Al_2O_3$, as conventional X5R composition applications.

TABLE 1

| | $BaTiO_3$ | $MnO_2$ | $V_2O_5$ | $SiO_2$ | $TiO_2$ |
|---|---|---|---|---|---|
| Example 1 | 100 mol | 0.1 mol | | 0.4 mol | 0.4 mol |
| Example 2 | 100 mol | 0.2 mol | | 0.4 mol | 0.3 mol |
| Example 3 | 100 mol | 0.3 mol | | 0.4 mol | 0.2 mol |
| Example 4 | 100 mol | 0.5 mol | | 0.4 mol | — |
| Example 5 | 100 mol | | 0.05 mol | 0.4 mol | 0.4 mol |
| Example 6 | 100 mol | | 0.1 mol | 0.4 mol | 0.3 mol |
| Example 7 | 100 mol | | 0.15 mol | 0.4 mol | 0.2 mol |
| Example 8 | 100 mol | | 0.25 mol | 0.4 mol | — |
| Example 9 | 100 mol | 0.2 mol | 0.05 mol | 0.4 mol | 0.2 mol |
| Example 10 | 100 mol | 0.2 mol | 0.1 mol | 0.4 mol | 0.1 mol |

The electrical characteristics of the MLCC manufactured in the above examples and a comparative reference example were measured when 24 hours had elapsed after an external electrode was subjected to firing, which are shown in Table 2 and Table below. The data of bold characters in Table 2 and 3 represent the data of samples that were sintered at optimum sintering temperatures.

The electrical characteristics of the MLCC were measured when 24 hours had elapsed after the external electrode was subjected to firing. Capacitance at room temperature and dielectric loss (DF) of the MLCC chip were measured in 1 kHz using an LCR meter. Dielectric constant (permittivity) of the dielectrics of the MLCC chip at AC 0.5V/µm was calculated based on the capacitance, a thickness of the dielectric of the MLCC chip, an area of an internal electrode, and a number of laminated layers.

Insulation-resistance at room temperature was measured with 60 seconds of charging time under DC 10V/µm for each of 10 samples. A change in the capacitance based on a temperature was measured in a temperature range of −55° C. to 125° C.

The insulation resistance (IR) degradation behavior of proto-type MLCC was measured by increasing a voltage step of 10V/µm at 150° C. Here, the time for each step was 10 minutes, and the resistance value was measured with a time interval of 5 seconds. The high-temperature withstanding voltage may denote a voltage (1 Vr=10V/µm) in which an IR can withstand $10^5 \Omega$ or more by applying and increasing DC 10V/µm of the voltage steps for 10 minutes at 150° C. to the proto-type MLCC.

The value of an RC was a product of a room-temperature capacitance value measured in AC 0.5V/µm and 1 kHz and an insulation resistance value measured in DC 10V/µm.

TABLE 2

| Example | Sintering Temperature (° C.) | Permittivity ($\epsilon_r$) | DF (%) | RC (ΩF) | TCC (%) (85° C.) | TCC (%) (125° C.) | High temperature withstanding Voltage |
|---|---|---|---|---|---|---|---|
| 1 | 1175 | 3265 | 4.1 | 4.9 | — | — | — |
| | 1190 | 3053 | 3.9 | 5.1 | — | — | — |
| | 1205 | 2842 | 4.0 | 1.5 | −14.1 | −23.4 | — |
| | 1220 | 2296 | 2.8 | 12.6 | — | — | — |
| 2 | 1175 | 3169 | 4.1 | 1938 | — | — | — |
| | 1190 | 2822 | 3.6 | 1819 | — | — | — |
| | 1205 | 2532 | 3.9 | 1960 | −14.2 | −23.6 | 4 Vr |
| | 1220 | 1977 | 2.6 | 1296 | — | — | — |
| 3 | 1175 | 3146 | 3.7 | 2198 | — | — | — |
| | 1190 | 3070 | 3.3 | 1704 | — | — | — |
| | 1205 | 2701 | 4.0 | 1975 | −14.9 | −22.4 | 4 Vr |
| | 1220 | 1775 | 2.4 | 1753 | — | — | — |
| 4 | 1175 | 2636 | 3.0 | 1491 | — | — | — |
| | 1190 | 2600 | 3.7 | 1553 | — | — | — |
| | 1205 | 2414 | 2.6 | 1436 | −14.2 | −15.0 | 4 Vr |
| | 1220 | 1763 | 2.1 | 1401 | — | — | — |
| 5 | 1175 | 3273 | 5.8 | 379.6 | — | — | — |
| | 1190 | 3634 | 6.1 | 1222 | — | — | — |
| | 1205 | 3529 | 6.0 | 1453 | −10.1 | −25.9 | 4 Vr |
| | 1220 | 3383 | 5.9 | 1118 | — | — | — |

TABLE 2-continued

| Example | Sintering Temperature (° C.) | Permittivity ($\epsilon_r$) | DF (%) | RC (ΩF) | TCC (%) (85° C.) | TCC (%) (125° C.) | High temperature withstanding Voltage |
|---|---|---|---|---|---|---|---|
| 6 | 1175 | 3341 | 5.4 | 1576 | — | — | — |
|   | 1190 | 3290 | 5.9 | 1817 | — | — | — |
|   | 1205 | 3335 | 6.2 | 1787 | −7.8 | −23.3 | 6 Vr |
|   | 1220 | 3163 | 6.2 | 1910 | — | — | — |
| 7 | 1175 | 2456 | 4.6 | 1163 | — | — | — |
|   | 1190 | 3042 | 5.2 | 1318 | — | — | — |
|   | 1205 | 3144 | 5.8 | 1538 | −5.9 | −19.5 | 7 Vr |
|   | 1220 | 3056 | 5.7 | 1651 | — | — | — |
| 8 | 1175 | 2301 | 4.5 | 543 | — | — | — |
|   | 1190 | 2529 | 4.8 | 613 | — | — | — |
|   | 1205 | 2755 | 5.2 | 709 | −1.3 | −3.9 | 7 Vr |
|   | 1220 | 2662 | 5.1 | 756 | — | — | — |
| 9 | 1175 | 2873 | 3.9 | 3070 | — | — | — |
|   | 1190 | 3079 | 4.2 | 3256 | — | — | — |
|   | 1205 | 3255 | 4.5 | 3362 | −9.2 | −25.1 | 6 Vr |
|   | 1220 | 3252 | 4.5 | 3424 | — | — | — |
|   | 1230 | 3867 | 5.9 | 3755 | — | — | — |
| 10 | 1175 | 3439 | 5.3 | 2478 | — | — | — |
|    | 1190 | 3465 | 5.5 | 2664 | — | — | — |
|    | 1205 | 3482 | 6.1 | 2545 | −7.9 | −24.6 | 6 Vr |
|    | 1220 | 3583 | 7.2 | 3087 | — | — | — |

TABLE 3

| Reference Example | Sintering Temperature (° C.) | Permittivity ($\epsilon_r$) | DF (%) | RC (ΩF) | TCC (%) (85° C.) | TCC (%) (125° C.) | High temperature withstanding Voltage |
|---|---|---|---|---|---|---|---|
| Ref (X5R) | 1140 | 2572 | 5.8 | 163 | — | — | — |
|   | 1155 | 3510 | 7.3 | 4282 | −10.1 | −33.2 | 6 Vr |
|   | 1170 | 3710 | 8.8 | 4678 | — | — | — |
|   | 1185 | 3524 | 9.6 | 4395 | — | — | — |

1. Comparison of Characteristics Between Examples and Comparative Reference Example Referring to Tables 2 and 3, it may be seen that the characteristics of example 10 is most superior among examples 1 to 10. A comparison between the characteristics of example 10 and the comparative reference example may be as below. In the case of example 10, permittivity was about 3439 to 3583 and a dissipation factor (DF) was 5 to 7% in a sintering temperature range of 1175 to 1220. In the comparative reference example, dielectric constants was about 2572 to 3710 and the DF was 6 to 10% in a sintering temperature range of 1140 to 1185☐. Example 10 may show similar dielectric constants to that of comparative reference example, and show a smaller DF value than that of comparative example, and it may be seen that variation of the dielectric constant and DF with the variation of sintering temperature is also smaller.

In addition, in both example 10 and comparative example, X5R characteristics in which a TCC at 85 is less than ±5% were satisfied, and example 10 shows more excellent behavior than the comparative example in the high-temperature TCC beyond 85☐. The TCC of example 10 at 125 was about −22%. IF the thickness of the dielectric layer becomes thicker, the TCC beyond 85 may increase by the decrease of an AC field that is applied to the dielectrics, and thereby the dielectrics may be applicable to an X7R product when the thickness of the dielectric layer is increased such that the TCC at 125☐ is less than −15%.

As for the high-temperature withstanding voltage obtained from the insulation resistance behavior by applying a voltage step at a high temperature of 150, it may be seen that high-temperature insulation resistance characteristics with a similar level of 6 Vr were obtained in both example 10 and the comparative reference example.

2. The Behavior of MLCC Characteristics by the Variation of the Composition of the Examples In examples 1 to 4 in which manganese (Mn) concentration was doped by 0.1, 0.2, 0.3, and 0.5 mol %, respectively, the dielectric constant (permittivity) and the DF were reduced with an increase in the firing temperature, and the dielectric constant was reduced at the same firing temperature with an increase in manganese (Mn) concentration. In examples 5 to 8 in which vanadium (V) was doped by 0.1, 0.2, 0.3, and 0.5 mol %, respectively, the dielectric constant was not reduced with the increase in the firing temperature. However, it was also reduced at the same firing temperature by an increase in the vanadium (V) concentration. In examples 9 and 10 in which manganese (Mn) and vanadium (V) were co-doped, the dielectric constant was higher than that those cases where manganese (Mn) or vanadium (V) was doped alone, and the window of sintering temperature was wide and the variation of the dielectric constant by the variation of sintering temperature was also small.

In the example 1 in which manganese (Mn) was doped by 0.1 mol %, an RC value shows a significant low value of 10 ΩF or less, which was due to incomplete non-reducibility. However, in examples 2 to 4, as the concentration of manganese (Mn) was increased beyond 0.2 mol %, normal property of insulation resistance having the RC value of about 2000MΓ was obtained. However, in example 4, when the amount of manganese (Mn) was increased by 0.5 mol %, the RC value was reduced to 1000° F.

In examples 5 to 8 in which V was doped as shown examples 5 to 7, an RC value was 1000 to 2000 ΩF in a range which an amount of V was 0.1 to 0.3 mol %. In example 8, when the amount of V was increased by 0.5 mol %, the RC value was reduced below 1000 ΩF. In examples 9 and 10 where the manganese (Mn) and vanadium (V) were co-doped, the RC value was significantly higher beyond 2500 ΩF than those cases where the manganese (Mn) or vanadium (V) was doped alone, and the window of sintering temperature is wide, and the variation of RC value depending on a temperature change was also small.

When the examples 1~10 and the reference samples that were sintered at the most appropriate sintering temperature are compared, the dielectric constant decreases with an increase in the doping amount for the cases in which manganese (Mn) or vanadium (V) was doped alone, as shown in examples 1 to 4 or in examples 5 to 8. However, the capacitance increases with an increase in the amount of vanadium (V) ranging from 0.1 (example 9) to 0.2 mol % (example 10) for the cases in which the manganese (Mn) and vanadium (V) were co-doped as shown in examples 9 and 10. Also, the dielectric constant is higher than those cases in which manganese (Mn) or vanadium (V) was doped alone as shown in examples 1 to 4 or examples 5 to 8. As for the RC value, the RC value decreases with an increase in the doping amount for the cases in which manganese (Mn) or vanadium (V) was doped alone as shown in examples 1 to 4 or examples 5 to 8. However, the cases where the manganese (Mn) and vanadium (V) were co-doped as shown in examples 9 to 10, shows a higher RC value than those cases where the manganese (Mn) or vanadium (V) was doped alone as shown in examples 1 to 8.

As for TCC characteristics of a manganese (Mn)-doped MLCC as shown in examples 1 to 4, TCC at 85° C. was relatively lower in comparison with an X5R composition, although X5R characteristics were satisfied. As for TCC characteristics of a vanadium (V)-doped MLCC a shown in examples 5 to 8, the TCC at 85° C. was increased along with an increase in an amount of vanadium (V), and TCC characteristics was excellent in comparison with a manganese (Mn) doped MLCC samples. In the case in which the manganese (Mn) and vanadium (V) are co-doped as shown in examples 9 and 10, the TCC characteristics were influenced by the amount of vanadium (V). That is, when an amount of the manganese (Mn) and vanadium (V) of example 10 was 0.2 and 0.2 mol %, the TCC characteristics were almost the same as those of an MLCC in which vanadium (V) was doped alone by 0.2 mol % as shown example 6.

When the manganese (Mn) was doped as shown in examples 1 to 4, a difference in the resistance degradation behavior was not significant with an increase in the manganese (Mn) concentration. When vanadium (V) was doped as shown in examples 5 to 8, the resistance degradation behavior was significantly and systemically improved with an increase in the vanadium (V) concentration.

When the manganese (Mn) and vanadium (V) were co-doped as shown in examples 9 and 10, more stable resistance characteristics can be observed compared for the cases where the manganese (Mn) or vanadium (V) was doped alone. Thus, almost the same level of high-temperature insulation resistance characteristics as those of the comparative reference example could be obtained.

From the results of the above examples, it may be seen that when the optimum amount of the transition metal elements such as the manganese (Mn) and vanadium (V) were added, excellent capacitance, DF, room-temperature IR, and reliability may be implemented even without including the rare earth elements in the dielectric formulation. Therefore, the originality of the non-reducible dielectric composition according to the present exemplary embodiment is that dielectric composition may not include the fixed valence-acceptor elements and the rare earth-elements, and mainly include just small amount of the transition metal elements within a specific range, and thereby, the non-reducibility and reliability of a dielectric composition may be simultaneously obtained.

According to an exemplary embodiment, the fixed valence-acceptor elements and the rare earth-elements that occupied a high proportion in the conventional art are not included. In addition, as the thickness of the dielectric layer of an ultra-high capacitance MLCC may gradually become thinner, and the size of the matrix powder may gradually become smaller in the future, it may be difficult to mix uniformly the matrix powder and other additives; however, according to the present invention, the type and the amount of the additives may be significantly reduced in comparison with the conventional dielectric formulation materials to thereby overcome a problem in the uniform dispersion of additives, and thereby an MLCC having a more improved performance may be manufactured. Also, since the rare earth-elements that is seriously difficult to be supplied is not used, the manufacturing costs of the MLCC are thereby reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A reduction-resistant dielectric composition, which does not include both a fixed valence acceptor atom and a rare earth atom, comprising:
    a $BaTiO_3$-based matrix powder;
    0.1 to 1.0 moles of a transition metal oxide or transition metal carbonate, based on 100 moles of the matrix powder; and
    0.1 to 3.0 moles of a sintering aid including silicon oxide ($SiO_2$), wherein
    the $BaTiO_3$-based matrix powder includes $BaCO_3$ or $TiO_2$.

2. The reduction-resistant dielectric composition of claim 1, wherein an average particle size of the matrix powder is 0.05 to 0.5 μm.

3. The reduction-resistant dielectric composition of claim 1, wherein the transition metal element is at least one selected from a group consisting of manganese (Mn), vanadium (V), chromium (Cr), iron (Fe), nickel (Ni), cobalt (Co), copper (Cu), and zinc (Zn).

4. A ceramic electronic component, comprising:
    a ceramic body in which a plurality of dielectric layers are laminated;
    an internal electrode formed inside the ceramic body, and including a base metal; and
    an external electrode formed on an outer surface of the ceramic body, and electrically connected to the internal electrode,
    wherein the dielectric layer includes a $BaTiO_3$-based matrix powder, 0.1 to 1.0 moles of a transition metal oxide or transition metal carbonate based on 100 moles of the matrix powder, and 0.1 to 3.0 moles of a sintering aid including silicon oxide ($SiO_2$),
    wherein the $BaTiO_3$-based matrix powder includes $BaCO_3$ or $TiO_2$, and
    wherein the dielectric layer does not include both a fixed valence acceptor atom and a rare earth atom.

5. The ceramic electronic component of claim 4, wherein a thickness of each of the plurality of dielectric layers is 0.1 to 10.0 μm.

6. The ceramic electronic component of claim 4, wherein the internal electrode includes nickel (Ni) or a nickel (Ni) alloy.

* * * * *